United States Patent [19]
Field et al.

[11] 3,839,310
[45] Oct. 1, 1974

[54] N-VINYL LACTAM-C10-22 VINYL ETHER COPOLYMER AS PROTECTIVE COLLOIDS IN VINYL CHLORIDE SUSPENSION POLYMERIZATION

[75] Inventors: Nathan D. Field, Wyckoff, N.J.; Edwin M. Smolin, Easton; Earl P. Williams, Pen Argyl, both of Pa.

[73] Assignee: GAF Corporation, New York, N.Y.

[22] Filed: Jan. 8, 1973

[21] Appl. No.: 322,083

[52] U.S. Cl.............................. 260/92.8 W, 260/80 P
[51] Int. Cl......... C08f 1/09, C08f 19/00, C08f 3/30
[58] Field of Search................... 260/92.8 R, 92.8 W

[56] References Cited
UNITED STATES PATENTS

| | | | |
|---|---|---|---|
| 2,890,199 | 6/1959 | McNulty et al.................. | 260/45.5 |
| 3,218,302 | 11/1965 | Melamed............................. | 260/80 |
| 3,444,151 | 5/1969 | Verdol et al...................... | 260/86.7 |
| 3,663,520 | 5/1972 | Balwe et al..................... | 260/87.5 R |

Primary Examiner—Joseph L. Schofer
Assistant Examiner—John Kight
Attorney, Agent, or Firm—Walter C. Kehm; Samson B. Leavitt

[57] ABSTRACT

A copolymer of an N-vinyl lactam and a $C_{10-22}$ vinyl ether is disclosed as a protective colloid in the suspension polymerization of vinyl chloride. There is also disclosed a method of making poly(vinyl chloride) employing the above composition and the suspension polymerized vinyl chloride product made by the aforesaid method.

2 Claims, No Drawings

1

N-VINYL LACTAM-C10-22 VINYL ETHER COPOLYMER AS PROTECTIVE COLLOIDS IN VINYL CHLORIDE SUSPENSION POLYMERIZATION

BACKGROUND OF THE INVENTION

This invention relates to the suspension polymerization of vinyl chloride. More particularly, it relates to a novel protective colloid useful in the suspension polymerization thereof, a method employing same and the product produced thereby.

As is known, there are four basic types of polymerization processes, i.e., emulsion polymerization, solvent polymerization, bulk polymerization, and suspension polymerization. The latter is also known as "granular polymerization" or "pearl polymerization," the three terms being synonymous and in contrast to the other three types of polymerization processes. The practice of suspension polymerization is well known to involve suspending a monomer in water or another nonsolvent and, while so suspended, effecting polymerization. Heat and catalyst are employed as polymerization aids and the suspension is maintained during the course of the reaction by agitation and generally by stabilizing the system with a so called "suspension stabilizer." When the polymerization is complete, the polymer is recovered in particle or granular form by filtration or centrifugation without the aid of any additional specific means. The product is thereafter washed and dried and is ready for the market.

There are many variations of the suspension polymerization method generally described above. These variations appear in the art together with the specific difficulties that are encountered in their practice. The simple change from emulsion polymerization to suspension polymerization does not lead to problem free operation. In face, some of the difficulties found in emulsion polymerization are also experienced in suspension polymerization, notably, the production of a stock material which, when processed to form products, contains what is known in the art as "fisheyes." In the production of a high quality general purpose polymer material, it is perhaps misdescriptive to refer to any particular disadvantage as being most important. However, if any single one is most important, it is poor colloidability, as evidenced by the formation of fisheyes. This is because of the fact that all products formed from fisheye producing polymeric stock are inferior in quality in several important functional aspects, upon the number and size of fisheyes present.

Fisheyes may be visualized as small blotches, actually having the appearance of the eyes of fish, in a final plasticized polymer product. They are believed to result from the failure of some of the individual particles of the polymer stock to associate with the plasticizer. Thus, as to substance they are merely small particles of polymer surrounded by relatively large seas of plasticizer. Since the plasticized material is intended to be homogeneous, fisheyes indicate poor homogeneity and are imperfections in the final product. A relatively small number of fisheyes can be tolerated in the final product; in fact, it appears impossible to eliminate them completely by any process. The seriousness of their presence in large numbers may be indicated by the following comments which refer to the undesirable effects that they cause.

Excellent transparency of poly(vinylchloride) in some applications, for example, sheets and films, is an absolute necessity, both functionally and appearance wise. Where such products contain a substantial number of fisheyes, they are not clear and transparent; instead, they present a hazy appearance and may be degraded in clarity to the point of mere translucency. As is known, dielectric strength in some electrical applications is important and where the product contains many fisheyes, it is unsuitable for these uses because of the reduced dielectric strength. Additionally, fisheyes result in the formation of a rough, uneven surface which cannot be smoothed. Products containing fisheyes are low in structural strength; especially the tear resistance of poly(vinylchloride) sheets is seriously impaired. Fisheyes are undesirable for still other reasons which need not be mentioned but which are appreciated by those skilled in the art.

While, as noted above, the polymeric mass that is produced by a properly managed suspension polymerization method may be quite easily and quickly washed free of impurities and is readily dried, it is extremely difficult to control the particle size of the granular mass that is formed, whereby such ease of washing and drying is attained. From the standpoint of operating efficiency, and thus the commercial advantage in low production cost that the suspension polymerization process affords, the problem of product size is frequently as serious as the problem of fisheyes.

As is apparent from the foregoing, the polymerized product must be separated from the aqueous medium. This may be accomplished by usual filtration or centrifuging methods provided that the product is within a suitable particle size range. If the particle size is too small, separation will be difficult and extremely slow, and, in fact, may be impossible in the practical sense. A mass of small particles holds the occluded suspending medium and prevents its release from the mass. Also, the particles themselves may pass through the filter along with the liquid. On the other hand, if the particles are too large or if the particles are not of a uniform desired size, serious obstacles are encountered in processing the polymer to its final product stage. Because of the processing requirements for handling larger particles, an inferior product results.

For example, in processing poly(vinylchloride) to sheet form, it is customary to admix with it a plasticizer and deliver it to a milling machine such as the well known roll mill which works the mixture to homogeneity. It has been found that poly(vinylchloride) deteriorates quite markedly during the processing stages if it is permitted to remain in contact with the hot rolls beyond a limited time. Large particles of polymer must be worked longer than small or medium particles and thus require a greater residence time in the mill. Accordingly, products formed from large particle sized polymers tend to suffer in their physical properties, such as color and heat stability. A mass of nonuniform size, that is to say, one containing particles of acceptable size and particles of a size that are regarded normally as too large, presents a similar difficulty because the polymer must remain upon the mill until all particles have been equally plasticized in order to obtain a homogeneous product.

Various attempts have been made to explain the reason for the formation of large globules or agglomerates of the polymer. It has been reported that during the polymerization reaction, the mass passes through a sticky, tacky state which is not broken up completely in the succeeding phase of the reaction and that violent aggitation seems only to increase tendency toward agglomeration. Also, it is reported that the reaction rate and temperature in the reaction zone is thought to be responsible for the problem. These possibilities need not be denied here as they may be entirely valid assumptions when considered in the light of the particular process from which they originate. However, it is suggested herein that the proper approach to solving the problem of uniform particle size resides in the basic suspension system itself, and that, if the suspension system is properly established, a preferred particle size can be obtained, and other conditions, such as temperature, reaction rate and agitation will exhibit a reduced influence upon particle size.

When polymers made with conventional colloids are processed, higher temperatures must be resorted to inasmuch as these colloids have high softening points and do not permit the polymer to properly flux at normal polymer fusing temperature. In other words, the difficulties that arise by trying to process polymers with a coating of a protective colloid is that the resin itself is not fused adequately and therefore the final binding ability of the resin itself is impaired. The result of not binding the filler properly is to obtain poor physical characteristics of the fabricating plastic.

Moreover, in many instances the viscosity and flow (as powder) of the conventional suspension polymers are not adequate, for the manufacture of articles such as phonograph records or floor tile. Furthermore, organic solutions of the suspension polymers containing the conventional colloids exhibit haze or gel and are not clear. Another difficulty present with conventional colloids is that they do not make blotter-type resins of high conversion.

SUMMARY OF THE INVENTION

It is, therefore, a principle object of the present invention to provide an improved suspension polymerization system to produce a polymer having enhanced processability and uniformity.

Another object of the invention is the provision of an improved suspending agent for use in suspension polymerization.

It is still a further object of this invention to provide a method for suspension polymerizing vinyl chloride monomer, to high conversion and to obtain polymers having improved coating properties, viscosity and flow and which provide organic solvent solutions which are clear and free of gel, slush or haze.

These and other objects and advantages of the invention will become more apparent to those skilled in the art as the description proceeds hereinafter.

Broadly speaking, the invention includes the provision of a copolymer structure comprising the following repeating units,

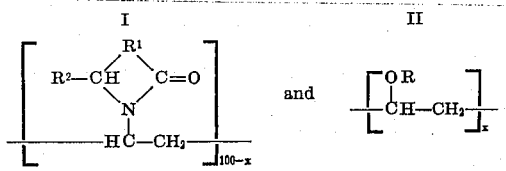

wherein R is $C_{10-22}$ alkyl, cycloalkyl and alkyl aryl and X represents the weight of unit II, said structure contains approximately by weight 75 to 95 parts of unit I and 5 to 25 parts of unit II, X represents the weight percent of R vinyl ether monomer, $R^1$ and $R^2$ are as defined hereinafter and said copolymer will preferably have a molecular weight of 5,000 to 1,000,000. There is furthermore provided an improved process for producing polymeric vinyl chloride, the improvement comprising suspending a copolymer as defined above in water and a peroxy initiator for said vinyl chloride, agitating the suspension and adding thereto said vinyl chloride, heating the thus formed suspension and thereafter separating the suspended polymer from the resultant water dispersion.

The N-vinyl lactams employed in forming the copolymer composition correspond to the formula:

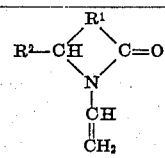

wherein $R^1$ grams represents a divalent are charged to a stirred polymerization flask a five, six or seven member heterocyclic ring system and $R^2$ is a member selected from the group consisting of hydrogen and lower alkyl, polymerization in said copolymer occurring through the ethylenically unsaturated groups.

As examples of N-vinyl lactams which may be employed in the instant invention, there may be mentioned the N-vinyl derivatives of gamma-, delta-, and epsilon-lactams (N-vinyl derivatives of the cyclic amides of gamma-, delta-, and epsilon-aminocarboxylic acids of the aliphatic series) and lower alkyl (methyl, ethyl) substituted derivatives of such N-vinyl lactams. Among this group, N-vinyl-2-pyrrolidone (otherwise referred to as 1-vinyl-2-pyrrolidone, N-vinyl-α-pyrrolidone) is preferred. As illustrative of other N-vinyl lactams within this group there may be mentioned N-vinyl-2-piperidone, N-vinyl-6-caprolactam, N-vinyl-5-methyl-2-pyrrolidone, N-vinyl-3,3-dimethyl-2-pyrrolidone, and the like. Other N-vinyl lactams which may be employed include N-vinyl-hexahydrophthalimidine, N-vinyl-naphthostyrile, etc. $C_{10-22}$ vinyl ethers suitable as monomers have the formula $CH_2 = CHOR$. Exemplary vinyl ethers include decyl vinyl ether; do decyl vinyl ether; tridecyl vinyl ether; tetradecyl vinyl ether; cetyl vinyl ether; 2-ethyl-1-decyl vinyl ether; hexadecyl vinyl ether; octadecyl vinyl ether; docosyl vinyl ether; decahydronaphthyl vinyl ether; hydroabietinyl vinyl ether; terpinyl vinyl ether, and the like.

While the process by which poly (vinyl chloride) resins may be prepared according to this invention involves the cooperation of a number of reaction conditions, the process, in the main, is not difficult to manage and to sustain in commercial operation. It is necessary only to observe with care the various conditions that are described herein whereby it is believed, a product is obtained which is equal to, if not superior to, any known commercial poly(vinyl chloride) product. The reaction time is not inordinately long, it requires less than about 20 hours under preferred conditions, and, if desired, can be speeded up considerably.

The suspension stabilizer contents may, of course, be varied somewhat in different applications. However, it is generally desirable to employ the copolymer of an N-vinyl lactam and vinyl ether in a small but effective amount, typically within the range from about 0.05 to about 4.0 percent by weight of the vinyl chloride present, preferably 0.1 to 0.5 percent. The copolymer of said N-vinyl lactam and $C_{10-22}$ vinyl ether should preferably constitute by weight 75 to 95 percent, preferably 78 to 94% vinyl-lactam and approximately 5 to 25 percent, preferably 6 to 22 percent vinyl ether.

The reaction temperatures herein suggested do not appear to have any significant effect upon either the particle size or the number of fisheyes that may result in the final formed product, however, as is well known, high temperature generally results in the production of a polymeric material of reduced strength. Accordingly, the temperature should be maintained at a level consistant with good molecular weight, and adequate speed of the reaction. For example, lauroyl peroxide is an effective catalyst in the polymerization of vinyl chloride and excellent results are thereby obtained by operating at a temperature of about 48°C to about 55°C. This temperature range is in most instances preferred. However, the reaction proceeds with good order at from about 42°C to about 72°C, although about 45°C to about 60°C is more suitable since at about 45°C, the reaction is slow and at temperatures of about 72°C and above, some undersirable fusion of particles may take place.

The invention is not restricted to any particular catalysts, since the reaction conditions suggested do not interfere with the activity of the catalyst and no well recognized catalyst is known which defeats the ends of the invention, it being preferred, of course, to employ a catalyst soluble in vinyl chloride. Accordingly, for example, there may be employed any one of the well known catalysts such as benzoyl peroxide, lauroyl peroxide, dicaproyl peroxide, acetyl benzoyl peroxide, diacetyl peroxide, p-tertiary-butyl perbenzoate, tertiary butyl perlaurate, ditertiary-butyl peroxide; organic azo compounds, such as alpha, alpha-1-azo-diisobutyronitrile and dimethyl alpha, alpha-1-azo-diisobutyrate. Each catalyst will have its active concentration, that is to say a concentration sufficient to effect substantially complete polymerization at a suitable reaction rate. The reaction proceeds without difficulty or disadvantage in the presence of any said catalysts with concentrations of 0.10 to about 0.40 percent by weight of the monomer. However, catalyst concentrations of about 0.15 to about 0.30 percent are more suitable because of the improved reaction rate, and generally, about 0.20 to about 0.25 percent by weight of vinyl chloride is preferred. While the effects of excessive catalyst concentration are not especially notable, it has been observed that an excess of catalyst tends to produce a material of reduced heat stability, and one having slightly reduced strength characteristics which are apparently due to a reduction in molecular weight. In selecting the catalyst, especially if the end product is to be used in electrical applications where dielectric strength is a factor, care should be taken to select a catalyst which will not be detrimental in this respect and, further, it should not exert an emulsifying effect. The peroxide catalysts are preferred, lauroyl peroxide being a suitable and specially effective catalyst.

The method by which the reaction is initiated may exert an influence upon product quality. It will be understood, however, that no particular start up method is critical to the ends of the invention; rather, the preferred procedure seems to serve to enhance the final result.

The reaction may be carried to 100 percent conversion or substantially so, if desired, but may also be terminated short of completion as desired or a convenience of plant conditions may dictate. When the reaction is completed to the desired extent, the polymeric vinyl chloride may be separated from the reaction medium by known means.

Raw material purity and contamination are quite important, since important properties of the product may be adversely affected thereby. In particular, aldehydes, phenols, acetylenic compounds, iron and sodium salts, calcium, soaps, fatty acids and the like may be in the raw material or enter the system from an outside source and precautions should be taken to insure a reasonable maximum purity at all times.

Generally, it is preferred to conduct the polymerization at a pH upwards of about 7.0. However, in some instances it is desirable to operate in an acid medium. Various acids may be utilized to effect the desired pH value, the prominent controlling factor in its selection being that it should not impair dielectric properites. Thus, acids such as sulfuric, hydrochloric, phosphoric and acetic are suitable, phosphoric acid being preferred.

The water-vinyl chloride ratio in the system is not critical. This ratio may vary from about 1.50 to about 4:1. More suitable, however, due to decrease in volume to be handled, is a watervinyl chloride ratio of about 1.90 to about 3:1, the preferred range being about 1.90 to about 2.25:1. All of these ratios are by volume.

The vinyl lactam portion of the aforedescribed copolymer is polymerized with the vinyl ether by methods known in the art and need not be described herein. In general, the polymeric product thus obtained which functions as a protective colloid in the suspension polymerization of the vinyl chloride herein, will contain the vinyl lactam portion and the vinyl ether portion in relative amounts from about 95 to 75 percent vinyl lactam and from about 5 to 25% of the copolymerizable vinyl ether. Preferred polymers are those colloids containing from about 94 to 78% by weight of vinyl lactam and the balance vinyl ether. In the colloid copolymer, the vinyl lactam group and the vinyl ether group may alternate, may be randomly disposed or may be in the form of blocks. The average molecular weight of the colloid copolymer will vary over a wide range of from about 5,000 to 1,000,000.

The polymeric colloids are miscible or dissolved in many solvents such as benzoyl alcohol, diacetone alcohol; tetrahydrofuran, acetone, methyl ethyl ketone, methyl isobutyl ketone, benzene, toluene, xylene, and the like and mixtures thereof.

The polymeric colloid is used in amounts of from about 0.05 to about 4.0 percent by weight, preferably from about 0.1 to about 0.5 percent by weight, based on the weight of the suspension polymeric vinyl chloride obtained or on the total weight of the monomeric vinyl chloride charged to the suspension polymerization system.

The vinyl chloride polymers obtained according to the present invention can be plasticized with well known plasticizers such as dioctyl phthalate, tricresyl phosphate, the nonmigratory polyester plasticizers and others well known in the art. Stabilizers, antidegradents (antioxidant), fillers, rubber, resins, pigments, dyes, fungicides, and other compounding ingredients can be mixed and blended with these polymers as is customary in the art.

DETAILED DESCRIPTION

In order that those skilled in the art may better understand the invention and the method by which the same may be carried into effect, the following examples are offered. All parts and proportions in the following examples as well as in the appended claims are by weight unless otherwise specified.

EXAMPLE I

Suspension polymerization of vinyl chloride

| Components | |
|---|---|
| 1. Distilled water | 170.00 |
| 2. Poly (VP/$C_{16-18}$ VE) prepared as Example II, 50% active* | 0.60 |
| 3. Lauroyl Peroxide | 0.15 |
| 4. Vinyl chloride | 100.00 |

*Copolymer of vinyl pyrrolidone and cetyl vinyl ether supplied as a 50% solution in SDA-40 ethanol. The relative viscosity for a 1% solution in ethanol is 1.539.

Components 1, 2, and 3 are introduced into a glass reactor, having a 1.5 liter capacity and equipped with two 4inch propellers (two inches apart), at room temperature. The reactor is then evacuated (house vacuum) to remove all air from the system. When maximum vacuum has been obtained, the reactor is sealed, agitation (~500 rpm) commenced, and component four charged. The contents of the reactor are heated to the desired polymerization temperature (50°C) and maintained at this temperature for 20 hours. The reaction vessel is then vented to the atmosphere for removal of the residual monomer.

The resultant dispersion is then cooled, filtered, water washed and dried in a laboratory vacuum oven at 50°C for 24 hours.

EXAMPLE II

Preparation of 89 parts VP/11 parts $C_{16-18}$VE copolymer
66.8 grams vinylpyrrolidone
16.5 grams mixture of 65.8 percent cetyl vinyl ether, 29.5 percent octadecyl vinyl ether and 4.7 percent lower alkyl vinyl ethers
150.0 grams ethanol SDA-40 grade
0.3 grams "Vazo" (azobisisobutyronitrile) ARE CHARGED TO A STIRRED POLYMERIZATION FLASK 66.8 grams vinylpyrrolidone are charged to an addition funnel attached to the polymerization flask. The entire apparatus and contents are then purged of air and released with nitrogen. The contents of this flask are heated to 60°C in one-half hours and held at 60°–67°C for 1¼ hours at which time 33.4 g. vinylpyrrolidone are added from the addition funnel. The reaction mixture is held an additional 2 hours at 66°–70°C at which time an additional 33.4 gr. vinylpyrrolidone are added to the reaction mixture from the addition funnel. The reaction is continued for an additional 18½ hours at 67°–68°C.

Brookfield viscosity model RVT spindle No. 7 at 100 rpm. indicates 3600 cps.
Relative viscosity 1 percent in ethanol = 1.5.

EXAMPLE III

Preparation of 80 parts VP/20 parts cetyl vinyl ether copolymer and 75 parts VP/25 parts cetyl vinyl ether copolymer A stock solution of vinylpyrrolidone is prepared as follows:
40.0 grams distilled vinylpyrrolidone
0.8 grams "Vazo" are charged to a 100 ml. volumetric flask and dissolved in C.P. ethanol filled to the mark.

A stock solution of VINYL pyrrolidone/cetyl vinyl ether is also prepared (Soln VP/VE)
20.0 grams distilled vinyl pyrrolidone
20.0 grams cetyl vinyl ether
0.8 grams vazo are charged to a 100 ml. volumetric flask and dissolved in C.P. ethanol by filling to the mark.

Polymerization tubes are charged with the above solutions as follows:

| Tube | No. 1 | No. 2 | No. 3 |
|---|---|---|---|
| mls. solution VP | 30 | 18 | 15 |
| mls. solution VP/VE | none | 12 | 15 |
| ratio VP/VE | control 100% VP | 80/20 | 75/25 |

The polymerization tubes and contents are cooled to −75°C evacuated of air and sealed. After allowing to thaw they are heated in a constant temperature bath at 65°C for 17 hours. At the end of this time the contents of each tube is dissolved in 25 ml. C.P. methanol and each precipitated by addition to one pound C.P. diethyl ether.

After drying, the precipitated polymers weigh 11.2; 8.2; and 7.2 grams, respectively.

Polymers from tube No. 1 and No. 2 are water soluble, while the polymer obtained from tube No. 3 is not. This product would, therefore, not be acceptable for use as a protective colloid. The upper limit of cetyl vinyl ether content suitable for use lies between 20 and 25 percent based on the weight of the monomers charged.

Use of lower alkyl vinyl ethers, such as dodecyl vinyl ether, however, might be soluble.

EXAMPLE IV

Preparation of 92/8 and 90/10 copolymers of Vinylpyrrolidone/Cetyl Vinyl Ether in Methanol.

A stock solution of vinylpyrrolidone is prepared as follows: (Soln VP)
50.0 grams distilled vinylpyrrolidone
0.1 grams vazo are charged to a 100 ml. volumetric flask and dissolved in C.P. methanol by filling to the mark. A stock solution of vinylpyrrolidone and cetyl vinyl ether mixture is also prepared (soln VP/VE).
40.0 grams distilled vinylpyrrolidone
10.0 grams cetyl vinyl ether
0.1 grams vazo are charged to a 100 ml. valumetric flask and dissolved in C.P. ethanol filled to the mark.

Polymerization tubes are charged with the above solutions as follows:

| TUBE | No. 4 | No. 5 |
|---|---|---|
| mls. solution VP | 18 | 15 |
| mls. solution VP/VE | 12 | 15 |
| ratio VP/VE | 92/8 | 90/10 |

The contents of the polymerization tubes are cooled to −75° evacuated of air and sealed. After allowing to thaw they are heated in a constant temperature bath at 65°C for 8 hours.

Relative viscosity 1% solution in methanol
Polymer No. 4 = 3.43
Polymer No. 5 = 3.25

EXAMPLE V

Components
1. Distilled water     170.00
2. poly (VP/$C_{14}$VE) prepared as in example II except that tetradecyl vinyl ether is used (50% active)*     0.60
3. Lauroyl Peroxide     0.15
4. Vinyl chloride     100.00

* Copolymer of vinyl pyrrolidone and tetradecyl vinyl ether supplied as a 50 percent solution in SDA-40 ethanol. The relative viscosity for a 1 percent solution in ethanol was 1.54.

Components 1, 2, and 3 were introduced into a glass reactor, having a 1.5 liter capacity and equipped with two 4 inch propellers (two inches apart), at room temperature. The reactor was then evacuated (house vacuum) to remove all air from the system. When maximum vacuum had been obtained, the reactor was sealed, agitation (~500 rpm) commenced, and component 4 was charged. The contents of the reactor were heated to the desired polymerization temperature (50°C) and maintained at this temperature for 20 hours. The reaction vessel was then vented to the atmosphere for removal of the residual monomer.

The resultant suspension was then cooled, filtered, water washed and dried in a laboratory vacuum over at 50°C for 24 hours.

EXAMPLE VI

Components
1. Distilled water     170.00
2. poly(VP/$C_{12}$VE) prepared as in example II except that dodecyl vinyl ether is used (50% active)*     0.60
3. Lauroyl Peroxide     0.15
4. Vinyl chloride     100.00

* Copolymer of vinyl pyrrolidone and dodecyl vinyl ether supplied as a 50% solution in SDA-40 ethanol. The relative viscosity for a 1% solution in ethanol was 1.5.

The procedure and apparatus of EXAMPLE V is followed.

The resultant dispersion was then cooled, filtered, water washed and dried in a laboratory vacuum oven at 50°C for 24 hours.

Table 1

Properties of Vinyl Chloride Suspension Resins Prepared Using Poly (VP/$C_{16-18}$VE) (89/11 vinyl pyrrolidone cetyl ether monomer ratio) as a Protective Colloid 1.5:1 water-monomer ratio, 0.15 lauroyl peroxide catalyst, 48°C with continuous agitation

| Experiment Number | Suspending Agents conc., wt. (on monomer) | Conversion to polymer | Bulk Density grams/cc. | Plasticizer absorption gms/100 gms DOP | Heat Stability (Minutes) Yellow | Heat Stability (Minutes) Brown | Sieve Analysis on 40 Mesh | on 60 Mesh | on 80 Mesh | on 100 Mesh | on 200 Mesh | thru 200 Mesh |
|---|---|---|---|---|---|---|---|---|---|---|---|---|
| 1 | 0.3 | 80 | 0.350 | 104 | 35 | 50 | 13.8 | 13.4 | 3.6 | 1.2 | 2.4 | 65.6 |
| 2 | 0.5 | 80 | 0.388 | 96 | 30 | 50 | 6.2 | 1.0 | 1.0 | 1.4 | 2.6 | 87.0 |
| 3 | 0.7 | 75 | 0.316 | 94 | 20 | 40 | 6.8 | — | 2.6 | 2.0 | 0.8 | 86.2 |

Table 2

Properties of Vinyl Chloride Suspension Resins Prepared Using PVP K-30 and PVP K-90 as Protective Colloids

| Experiment Number | Suspending Agents conc., wt. (on monomer) | Conversion to Polymer | Bulk Density grams/cc. | Plasticizer absorption gms/100 gms DOP | Heat Stability (Minutes) Yellow | Heat Stability (Minutes) Brown | Sieve Analysis on 40 Mesh | on 60 Mesh | on 80 Mesh | on 100 Mesh | on 200 Mesh | thru 200 Mesh |
|---|---|---|---|---|---|---|---|---|---|---|---|---|
| 4 | PVP K-30, 0.3 | 80 | 0.448 | 102 | 20 | 60 | 0 | 0.2 | 6.1 | 30.4 | 54.2 | 8.8 |
| 5 | PVP K-30, 0.5 | 85 | 0.389 | 112 | 20 | 50 | 0.6 | 3.0 | 25.0 | 27.1 | 36.0 | 7.4 |
| 6 | PVP K-30, 0.7 | 84 | 0.467 | 84 | 20 | 50 | 13.9 | 10.3 | 57.4 | 13.1 | 15.9 | 1.8 |
| 7 | PVP K-90, 0.3 | 80 | 0.462 | 108 | 20 | 50 | 0 | 2.7 | 13.9 | 52.0 | 25.8 | 4.4 |
| 8 | PVP K-90, 0.5 | 83 | 0.292 | 168 | 20 | 40 | 8.6 | 5.0 | 16.1 | 37.6 | 24.4 | 7.9 |
| 9 | PVP K-90, 0.7 | 84 | 0.444 | 75 | 20 | 40 | 13.9 | 2.3 | 3.7 | 13.5 | 55.1 | 11.2 |

Tables 1 and 2 compare the physical properties of the beads obtained using a poly (vinylpyrrolidone/cetyl vinyl ether) copolymer as a suspension agent or protective colloid. The poly (vinylpyrrolidone) used as a control therein has a K value of 30 or 90.

As is clearly apparent from the data in Tables 1 and 2, the particle size and distribution of particle size of the resin produced with the vinylpyrrolidone/cetyl vinyl ether copolymer are smaller and narrower than those prepared with the homopolymer of vinylpyrrolidone. In the case of poly (vinylpyrrolidone/cetyl vinyl ether) up to 87 percent of the produced poly (vinyl chloride) beads passed through a two hundred mesh screen as compared to no more than 12 percent for those prepared with poly (vinylpyrrolidone) alone. In addition, the poly (vinylpyrrolidone) produced resin displayed a particle size distribution in the 60–200 mesh range while the poly (vinylpyrrolidone/cetyl vinyl ether) yields a resin in the vicinity of 200 mesh.

The protective colloid as is evidenced by the results in Table 1 and 2 shows a remarkable effect on the heat stability of the poly(vinylchloride) beads. In the case of a poly(vinylpyrrolidone) produced poly(vinylchloride), a discoloration was noted within 20 minutes. Under identical reaction and testing conditions, however, up to 75 percent improvement in heat stability is achieved with poly (vinylchloride) beads prepared with a 0.3 percent based on the weight of the vinylchloride, vinylpyrrolidone/cetyl vinyl ether copolymer protective colloid.

The results in Tables 1 and 2 above, clearly show that poly (vinylpyrrolidone/cetyl vinyl ether), like poly(vinylpyrrolidone), is useful for the manufacture of poly(vinylchloride) resins having good plasticizer absorbtivity. The data indicates, however, that this property decreases with increased use concentration of poly(vinylpyrrolidone/cetyl vinyl ether) copolymer protective colloid. The irregularity of the plasticizer absorbtivity data for poly(vinylpyrrolidone) (Table 2), as related to use concentration of the protective colloids, can partially be attributed to the significant difference in particle size distribution of the poly(vinylchloride) beads. As is clearly apparent, the utilization of a poly(vinylpyrrolidone/cetyl vinyl ether) copolymer protective colloid in the suspension polymerization of vinyl chloride, under conditions described above, results in the formation of poly(vinyl chloride) beads having good processability, small particle size, narrow size distribution and good plasticizer absorbtivity.

The particle size is determined by shaking the resin through stacked sieves (40–200 mesh) and the weight percent of resin retained on each screen after such shaking is thereafter determined. The plasticizer absorbtion is determined by using the ASTM D-1755-66 test to determine the quantity in grams of dioctylphthalate absorbed by 100 grams of the resin. Heat stability is determined by placing a sample of extruded poly(vinylchloride) resin in an oven at 400°F and thereafter noting the time at which yellowing and darkening in color occur. The bulk density is determined by ascertaining the particular weight of resin required to fill a given volume, i.e., a 250 ml. graduated cylinder.

Since it is obvious that numerous changes and modifications can be made in the above-described details without departing from the spirit and nature of the invention, it is to be understood that all such changes and modifications are included within the scope of the invention.

Having thus described our invention, what we claim as new and desire to be secured by Letters Patent, is as follows:

1. A process for producing poly(vinyl chloride), comprising aqueous suspension polymerization of vinyl chloride monomer in the presence of a polymerization catalyst for said monomer and from about 0.05 to about 4.0 percent by weight based on the weight of said monomer of a copolymer functioning as a protective colloid and having a structure derived from the following repeating units:

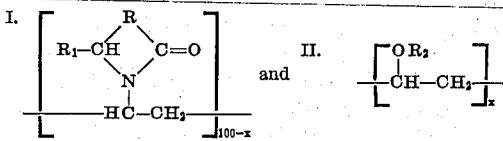

wherein $R_2$ is a $C_{10-22}$ alkyl, cycloalkyl or alkylaryl radical and wherein R represents a divalent alkylene bridge having sufficient carbon atoms to form a five, six or seven member hererocyclic ring system and $R_1$ is a member selected from the group consisting of hydrogen and lower alkyl and X represents the weight 75 to 95 parts of Unit I and 5 to 25 parts of Unit II.

2. A suspension polymerized vinyl chloride polymer produced in accordance with the process as defined in claim 1.

* * * * *